(12) United States Patent
Risney, Jr. et al.

(10) Patent No.: US 10,445,528 B2
(45) Date of Patent: Oct. 15, 2019

(54) CONTENT HANDLING FOR APPLICATIONS

(75) Inventors: David L. Risney, Jr., Redmond, WA (US); Scott B. Graham, Seattle, WA (US); Mathias Jourdain, Seattle, WA (US); Sermet Iskin, Bellevue, WA (US); David Andrew Ross, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/227,201

(22) Filed: Sep. 7, 2011

(65) Prior Publication Data
US 2013/0061282 A1 Mar. 7, 2013

(51) Int. Cl.
*G06F 21/62* (2013.01)
*G06F 21/52* (2013.01)
(Continued)

(52) U.S. Cl.
CPC ............ *G06F 21/629* (2013.01); *G06F 21/52* (2013.01); *G06F 21/53* (2013.01); *G06F 21/56* (2013.01); *G06F 21/566* (2013.01); *H04L 63/14* (2013.01); *H04L 63/145* (2013.01); *H04L 63/1408* (2013.01); *H04L 63/1416* (2013.01); *H04L 63/1433* (2013.01); *H04L 63/1441* (2013.01);
(Continued)

(58) Field of Classification Search
CPC ........ G06F 21/52; G06F 21/53; G06F 21/566; G06F 21/629; G06F 21/56; H04L 63/1408; H04L 63/145; H04L 63/14; H04L 63/1416; H04L 63/1433; H04L 63/1441; H04L 63/1483

USPC .......... 726/1, 14, 15, 26; 713/155, 156, 175, 713/176, 182; 380/251, 255, 278, 281
See application file for complete search history.

(56) References Cited

U.S. PATENT DOCUMENTS 6,505,300 B2 * 1/2003 Chan ................... G06F 21/53
709/229
7,047,562 B2 * 5/2006 Peterson et al. .............. 726/14
(Continued)

FOREIGN PATENT DOCUMENTS

CN 1698037 11/2005
CN 101815202 8/2010
(Continued)

OTHER PUBLICATIONS

J. Lin, J. Chen and C. Liu, "An Automatic Mechanism for Sanitizing Malicious Injection," 2008 The 9th International Conference for Young Computer Scientists, Hunan, 2008, pp. 1470-1475. (Year: 2008).*
(Continued)

Primary Examiner — Kari L Schmidt

(57) ABSTRACT

Techniques for content handling for applications are described. In one or more implementations, a first set of content handling policies is enforced for a first portion of an application that is permitted to invoke code elements of the computing device and a second set of content handling policies is enforced for a second portion of the application that is not permitted to invoke the code elements. Further, a determination is made whether to apply the first set of content handling policies or the second set of content handling policies to content based on which portion of the application is requesting the content.

20 Claims, 6 Drawing Sheets

(51) Int. Cl.
  *H04L 29/06* (2006.01)
  *G06F 21/56* (2013.01)
  *G06F 21/53* (2013.01)

(52) U.S. Cl.
  CPC .. *H04L 63/1483* (2013.01); *G06F 2221/2141* (2013.01)

(56) References Cited

U.S. PATENT DOCUMENTS

| | | | | |
|---|---|---|---|---|
| 7,051,366 | B1* | 5/2006 | LaMacchia | G06F 21/6209 726/14 |
| 7,120,250 | B2* | 10/2006 | Candelore | 380/200 |
| 7,216,160 | B2* | 5/2007 | Chintalapati | G06F 11/3409 370/352 |
| 7,308,648 | B1* | 12/2007 | Buchthal | G06F 16/986 715/234 |
| 7,774,620 | B1* | 8/2010 | Stott | G06F 21/51 380/59 |
| 7,895,296 | B1 | 2/2011 | Dayan | |
| 8,037,527 | B2* | 10/2011 | Milener | G06F 21/51 726/22 |
| 2004/0260754 | A1* | 12/2004 | Olson | H04L 29/06 709/200 |
| 2005/0149726 | A1* | 7/2005 | Joshi et al. | 713/164 |
| 2006/0037082 | A1* | 2/2006 | LaMacchia | G06F 21/52 726/27 |
| 2006/0070112 | A1* | 3/2006 | LaMacchia et al. | 726/1 |
| 2006/0236100 | A1* | 10/2006 | Baskaran | G06F 21/51 713/165 |
| 2006/0294102 | A1 | 12/2006 | Reddish et al. | |
| 2007/0118558 | A1* | 5/2007 | Kahandaliyanage | G06F 9/468 |
| 2007/0156871 | A1* | 7/2007 | Braun | G06F 21/6209 709/223 |
| 2008/0263650 | A1* | 10/2008 | Kerschbaum | G06F 21/6218 726/9 |
| 2008/0301766 | A1* | 12/2008 | Makino et al. | 726/1 |
| 2008/0313648 | A1 | 12/2008 | Wang et al. | |
| 2008/0320567 | A1* | 12/2008 | Shulman | H04L 63/1416 726/4 |
| 2009/0064337 | A1* | 3/2009 | Chien | G06F 21/564 726/25 |
| 2009/0070869 | A1* | 3/2009 | Fan | G06F 21/51 726/22 |
| 2009/0119769 | A1* | 5/2009 | Ross | G06F 21/55 726/13 |
| 2009/0249482 | A1* | 10/2009 | Sarathy | G06F 21/567 726/22 |
| 2009/0249484 | A1* | 10/2009 | Howard | G06F 21/567 726/24 |
| 2009/0249489 | A1* | 10/2009 | Livshits | G06F 21/54 726/26 |
| 2009/0282477 | A1 | 11/2009 | Chen et al. | |
| 2009/0327705 | A1 | 12/2009 | Ray et al. | |
| 2010/0058467 | A1 | 3/2010 | Ivory et al. | |
| 2010/0186089 | A1* | 7/2010 | Fu | G06F 21/53 726/23 |
| 2010/0235830 | A1 | 9/2010 | Shukla et al. | |
| 2010/0257603 | A1* | 10/2010 | Chander | G06F 21/54 726/22 |
| 2011/0162070 | A1 | 6/2011 | Krasser et al. | |

FOREIGN PATENT DOCUMENTS

| | | |
|---|---|---|
| EP | 2339848 | 6/2011 |
| JP | 2004501467 | 1/2004 |
| JP | 2010092376 | 4/2010 |
| RU | 2307390 | 9/2007 |
| WO | WO-2008033445 | 3/2008 |

OTHER PUBLICATIONS

Stamm, Sid, Brandon Sterne, and Gervase Markham. "Reining in the web with content security policy." Proceedings of the 19th international conference on World wide web. ACM, 2010, pp. 921-930. (Year: 2010).*

M. T. Louw and V. N. Venkatakrishnan, "Blueprint: Robust Prevention of Cross-site Scripting Attacks for Existing Browsers," 2009 30th IEEE Symposium on Security and Privacy, Berkeley, CA, 2009, pp. 331-346. (Year: 2009).*

Yee, et al., "Native Client: A Sandbox for Portable, Untrusted x86 Native Code", Retrieved at <<http://static.googleusercontent.com/external_content/untrusted_dlcp/research.google.com/en//pubs/archive/34913.pdf>>, Communications of the ACM—Amir Pnueli: Ahead of His Time, vol. 53, No. 1, Jan. 2010, pp. 15.

Reis, Charles., "Improving the Security and Robustness of Modern Web Browsers", Retrieved at <<http://citeseerx.ist.psu.edu/viewdoc/download?doi=10.1.1.112.2006&rep=rep1&type=pdf>>, General Exam Report, May 2007, pp. 1-15.

Dutta, Sunava., "An Introduction to Cross-Document Messaging in Internet Explorer 8", Retrieved at <<http://msdn.microsoft.com/en-us/library/cc511311%28v=vs.85%29.aspx>>, May 2008, pp. 5.

Zakas, Nicholas C., "Learning from XAuth: Cross-domain localStorage", Retrieved at <<http://www.nczonline.net/blog/2010/09/07/learning-from-xauth-cross-domain-localstorage/>>, Sep. 7, 2010, pp. 7.

"Developers Guide—SafeHtml", Retrieved at <<http://code.google.com/webtoolkit/doc/latest/DevGuideSecuritySafeHtml.html>>, Retrieved Date: Jul. 18, 2011, pp. 8.

"International Search Report", dated Dec. 10, 2012, Application No. PCT/US2012/053620, Filed Date: Sep. 4, 2012, pp. 09.

"Extended European Search Report", EP Application No. 12829988.0, dated Apr. 28, 2015, 7 pages.

Meyerovich,"ConScript: Specifying and Enforcing Fine-grained Security Policies for Javascript in the Browser", Retrieved from <<http://citeseerx.ist.psu.edu/viewdoc/download?doi=10.1.1.164.2441&rep=rep1&type=pdf>>, Nov. 18, 2009, 16 pages.

"Foreign Office Action", CN Application No. 201280043111.X, dated Oct. 10, 2015, 15 pages.

"Second Office Action Issued in Chinese Patent Application No. 201280043111.X", dated May 12, 2016, 7 Pages.

"Office Action Issued in Japanese Patent Application No. 2014-529792", dated Dec. 6, 2016, 8 Pages.

"Office Action Issued in Mexican Patent Application No. MX/a/2014/002785", dated Oct. 25, 2016, 5 Pages.

"Foreign Notice of Allowance", CN Application No. 201280043111.X, dated Aug. 4, 2016, 6 pages.

"Foreign Office Action", AU Application No. 2012304788, dated Sep. 7, 2016, 3 pages.

"Foreign Office Action", JP Application No. 2014-529792, dated Jul. 12, 2016, 9 pages.

"Foreign Office Action", RU Application No. 2014108837, dated Sep. 15, 2016, 5 pages.

"WebSphere MQ: Application Programming Reference Version 7.0", Japan IBM, Apr. 2008, 4 pages.

"Office Action Issued in Canadian Patent Application No. 2,846,877", dated Aug. 31, 2018, 6 Pages.

"Foreign Notice of Allowance", RU Application No. 2014108837, dated Mar. 16, 2017, 17 pages.

"Office Action Issued in Korean Patent Application No. 10-2014-7006153", dated Aug. 8, 2018, 8 Pages.

"Office Action Issued in Canadian Patent Application No. 2,846,877", dated Jul. 3, 2018, 4 Pages.

"Office Action Issued in European Patent Application No. 12829988.0", dated Oct. 22, 2018, 4 Pages.

"Office Action Issued in Canadian Patent Application No. 2,846,877", dated Apr. 25, 2019, 5 Pages.

* cited by examiner

200

202
Enforce a first set of content handling policies for a portion of an application that is permitted to invoke code elements of the computing device and enforce a second set of content handling policies for a portion of the application that is not permitted to invoke the code elements

204
Determine whether to apply the first set of content handling policies or the second set of content handling policies to content based on which portion of the application is referencing the content

Fig. 2

CONTENT HANDLING FOR APPLICATIONS

BACKGROUND

Today's computer user has access to a wide variety of content, such as video content, audio content, text content, and so on. Not all content, however, is safe to be consumed on a computing device. For example, some content may include malicious executable code (e.g., malware) that, when executed, may gain unauthorized access to particular portions of a computing device and/or private information about a user.

While techniques exist for preventing malicious executable code from gaining such unauthorized access, these techniques typically do not take into account the desires of today's content developer. For example, a content developer may develop an application that can access remote content (e.g., web content) via a computing device. Current techniques do not typically consider how such remote content will be processed via the computing device in determining if the remote content will be allowed access to the computing device. Further, current techniques do not typically enable the content developer to specify that specific instances of remote content are to be allowed access to a computing device.

SUMMARY

Techniques for content handling for applications are described. In one or more implementations, a first set of content handling policies is enforced for a first portion of an application that is permitted to invoke code elements of the computing device and a second set of content handling policies is enforced for a second portion of the application that is not permitted to invoke the code elements. A determination is made whether to apply the first set of content handling policies or the second set of content handling policies to content based on which portion of the application is requesting the content.

In one or more implementations, it is detected that an application executing on a computing device includes a request to pass content to a code element of the computing device. Responsive to the detecting, a determination is made whether to allow the request based on whether the request is from a portion of the application that is permitted to invoke the code element.

In one or more implementations, a determination is made at a computing device that a request from an application to pass content to a code element is from a portion of the application that is permitted to invoke the code element. It is ascertained whether the content may be passed to the code element based on at least one of a source of the content or a content type for the content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2 is a flow diagram depicting a procedure in an example implementation in which content handling policies are enforced.

DETAILED DESCRIPTION

Overview

Computing devices may have access to a wide variety of content from a wide variety of sources. Some sources, however, may be unknown and thus content from such sources may not be trusted. Further, some types of content are inherently associated with a security risk and thus care should be taken before allowing such content to access certain portions of a computing device.

In certain scenarios, a user (e.g., an application developer) may want to access content from an unknown source. For example, the user may write an application that, when executed on a computing device, attempts to access content from a resource that is remote from and/or unknown to the computing device. Such content may include text content, pictures, video, audio, and so on. Techniques discussed herein enable such content to be utilized by an application while preventing unsafe content from gaining unauthorized access to sensitive portions and/or functionalities of a computing device.

Accordingly, techniques for content handling for applications are described. In one or more implementations, techniques may be employed to reduce a likelihood that malicious code (e.g., malware) can access sensitive portions of a computing device. This may be performed in a variety of ways, such as by separating functionalities of an application into a local compartment and a remote compartment. In implementations, functionalities associated with the local compartment enable an application to access sensitive portions of a computing device, such as system-level application programming interfaces (APIs). Thus, content restrictions may be enforced on the local compartment to prevent unsafe content from gaining access to sensitive portions of a computing device. Further, functionalities associated with the remote compartment may be prevented from accessing sensitive portions of a computing device, and thus may be permitted to access untrusted and/or unsafe content.

In the following discussion, an example environment is first described that is operable to employ techniques for content handling for applications described herein. Next, example content handling policies for preventing unsafe content from accessing sensitive portions of a computing device are described. Example procedures involving techniques for content handling for applications are then described which may be employed in the example environment as well as in other environments. Accordingly, the example environment is not limited to performing the example procedures. Likewise, the example procedures are not limited to implementation in the example environment.

Example Environment

Figure 1:
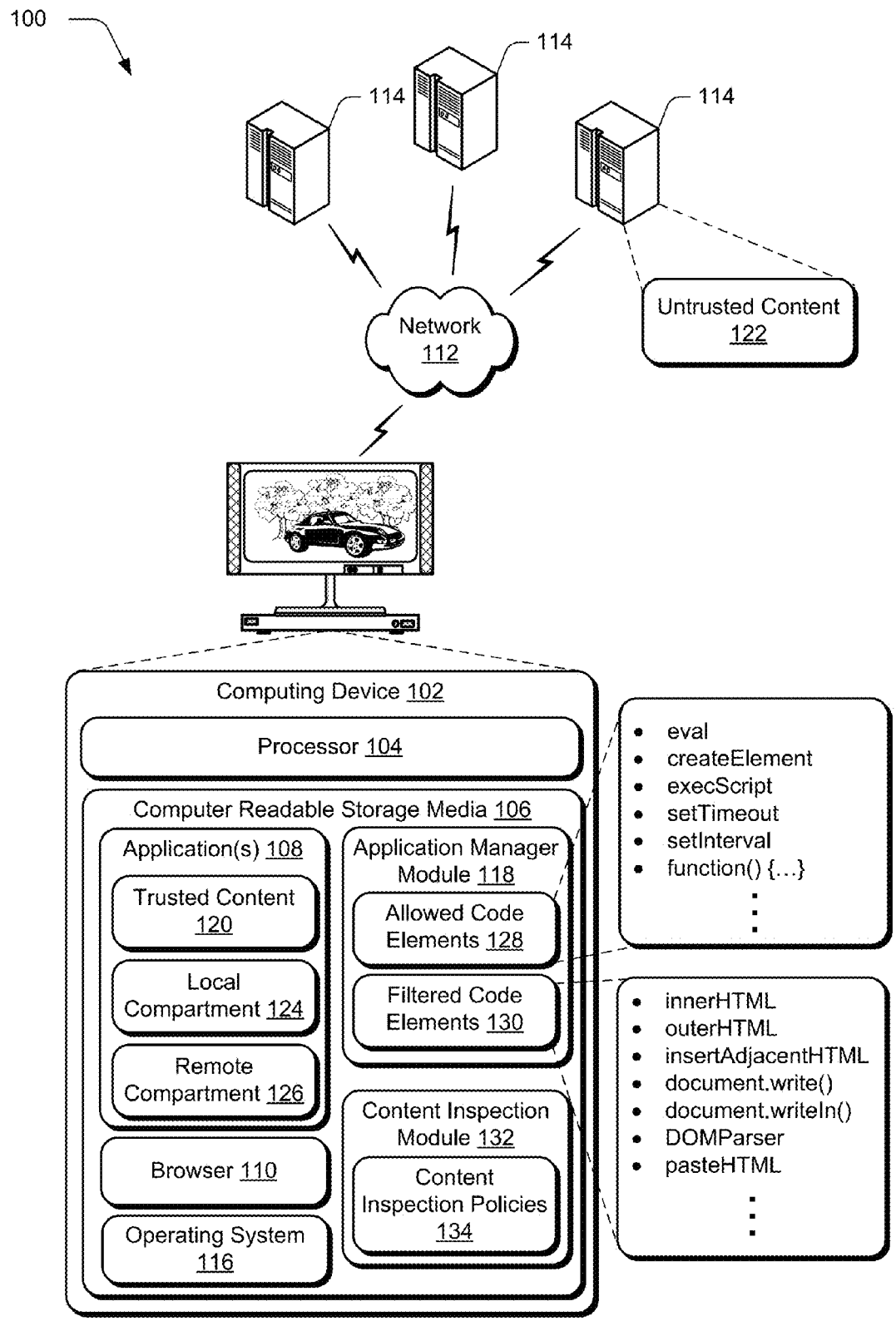
FIG. 1 is an illustration of an environment in an example implementation that is operable to employ techniques for content handling for applications.

FIG. 1 is an illustration of an environment 100 in an example implementation that is operable to employ techniques for content handling for applications. Environment 100 includes a computing device 102 having one or more processors 104, one or more computer-readable storage media 106, and one or more applications 108 that reside on the computer-readable storage media 106 and which are executable by the processor 104. Computing device 102 can be embodied as any suitable computing device such as, by way of example and not limitation, a desktop computer, a portable computer, a handheld computer such as a personal digital assistant (PDA), mobile phone, tablet computer, and the like. One of a variety of different examples of a computing device 102 is shown and described below in FIGS. 5 and 6.

The computing device 102 of FIG. 1 is also illustrated as including a browser 110, e.g., a web browser, which is representative of functionality that is configured to navigate via a network 112. Although the network 112 is illustrated as the Internet, the network may assume a wide variety of configurations. For example, the network 112 may include a wide area network (WAN), a local area network (LAN), a wireless network, a public telephone network, an intranet, and so on. Further, although a single network 112 is shown, the network 112 may be configured to include multiple networks.

The browser 110, for instance, may be configured to navigate via the network 112 to interact with content available from one or more web resources 114 as well as communicate data to the one or more web resources 114, e.g., perform downloads and uploads. The web resources 114 may include any suitable computing resource that is configured to provide content that is accessible via the network 112. Examples of such content include web pages, text content, video, audio, and so on.

One or more of the applications 108 may also be configured to access the network 112, e.g., directly themselves and/or through the browser 110. For example, one or more of the applications 108 may be configured to access one or more of the web resources 114 to retrieve and/or upload content. Thus, the applications 108 may also be configured for a variety of functionality that may involve direct or indirect network 112 access. For instance, the applications 108 may include configuration settings and other data that may be leveraged locally by the application 108 as well as synchronized with applications that are executed on another computing device. In this way, these settings may be shared by the devices. A variety of other instances are also contemplated. Thus, the computing device 102 may interact with content in a variety of ways from a variety of different sources.

Further illustrated as part of the computing device 102 is an operating system 116 that is representative of functionality to manage resources of the computing device 102 and provide access to functionalities of the computing device 102. The computing device 102 is also shown as including an application manager module 118 that is representative of functionality of the computing device 102 to monitor and distinguish activities of the applications 108. In one or more implementations, the application manager module 118 is configured to allow or disallow particular operations of the applications 108 based on whether the operations utilize trusted or untrusted content.

Illustrated as part of the applications 108 is trusted content 120, which is representative of data that is known to the computing device 102 as content that may be trusted and/or as content received from a trusted source. Additionally, the web resources 114 are illustrated as including untrusted content 122, which is representative of content that cannot be trusted based on a source of the content and/or characteristics of the content. In one or more implementations, the application manager module 118 may be configured to determine whether content may be trusted based on a source of the content. For example, if content is received from a source that is internal to the computing device 102 (e.g., from the trusted content 120), the application manager module 118 may discern that the content may be trusted. Further, if content is received from a source that is external and/or unknown to the computing device 102 (e.g., from the untrusted content 122), the application manager module 118 may discern that the content is untrusted.

Further illustrated as part of the applications 108 is a local compartment 124 and a remote compartment 126. In implementations, the local compartment 124 is representative of portions of the applications 108 that are permitted to access certain sensitive functionalities of the computing device 102. For example, the local compartment 124 includes application code that, when executed, may be permitted to invoke or access functionalities and/or portions of the computing device 102 that are generally protected from being accessed by entities that are external to the computing device 102. The remote compartment 126 is representative of portions of the applications 108 that are not permitted to access certain sensitive functionalities of the computing device 102. For example, application code included in the remote compartment 126, when executed, may be prevented from accessing sensitive functionalities of the computing device 102.

Further illustrated as part of the application manager module 118 are allowed code elements 128 and filtered code elements 130. The allowed code elements 128 and the filtered code elements 130 are representative of identifiers for functionalities of the computing device 102 that can be accessed by the applications 108 to perform one or more tasks via the computing device 102. Examples of a code element include a function, a subroutine, a method, a parameter, a property, an interface (e.g., an application programming interface (API)), and so on. In one or more implementations, a particular code element identified by the allowed code elements 128 and/or the filtered code elements 130 can provide access to sensitive portions of the computing device 102, such as functionalities provided by the operating system 116, user content files, private user information, and so on. The examples listed as part of the allowed code elements 128 and filtered code elements 130 are presented for purposes of example only, and it is to be appreciated that any functionality and/or portion of the computing device 102 can be included as part of the allowed code elements 128 and/or filtered code elements 130.

Dividing code elements that are available on the computing device 102 into the allowed code elements 128 and the filtered code elements 130 assists in preventing the applications 108 from inadvertently exposing sensitive portions of the computing device 102 to unsafe content. For example, the allowed code elements 128 include code elements that can be invoked by the local compartment 124 generally without restriction to perform various operations via the computing device 102. Access to the filtered code elements 130 may be subject to content inspection to avoid enabling unsafe content to access the filtered code elements 130. For example, when the applications 108 invoke one of the filtered code elements 130 to process content, the content is inspected to ensure that the content is safe before allowing the content to be passed to one of the filtered code elements 130.

The application manager module 118 can include criteria for determining if a code element is to be included as part of the filtered code elements 130. For example, the application manager module 118 can specify that if a particular code element may enable content to access and/or manipulate document object model (DOM) functionality of the computing device 102 (e.g., hypertext markup language (HTML) DOM functionality associated with the browser 110), the particular code element is to be included as part of the filtered code elements 130.

In implementations, the remote compartment 126 is not permitted to access the allowed code elements 128 or the filtered code elements 130. This can prevent unsafe content that is accessed from the remote compartment 126 from accessing sensitive portions of the computing device 102 via either the allowed code elements 128 or the filtered code elements 130.

The computing device 102 in the illustrated example is also shown as including a content inspection module 132. The content inspection module 132 is representative of functionality of the computing device 102 to inspect content that is requested and/or retrieved by the computing device 102, e.g., via the applications 108 and/or the browser 110. In one or more implementations, the content inspection module 132 is configured to inspect content to determine if the content is safe before allowing the content to be passed to one of the filtered code elements 130.

The content inspection module 132 includes content inspection policies 134 that may be used by the content inspection module 132 to determine if content (e.g., the trusted content 120 and/or the untrusted content 122) is safe or unsafe. For example, the content inspection policies 134 may specify that if content meets one or more criteria, the content is considered to be unsafe. In implementations, the content inspection policies 134 may specify that if untrusted content includes executable code (e.g., script) that may be executed by and/or on the computing device 102, the untrusted content is unsafe. Such executable code, when executed, may enable unauthorized access to portions of the computing device 102, such as functionalities of the operating system 116, private information associated with a user of the computing device 102, and so on.

While implementations are discussed herein with respect to unsafe content including executable code, it is to be appreciated that the content inspection policies 134 can include a variety of different criteria and filters that may be used to determine if content is safe or unsafe. For example, other criteria that the content inspection policies 134 may use to determine if content is unsafe include indications of particular web sites, content types, file types, web domains, and so on, that are considered unsafe.

If the content inspection module 132 determines that content is unsafe, the unsafe content is prevented from being passed to a particular code element of the filtered code elements 130. Conversely, if the content is determined to be safe, the content may be passed to the particular code element.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having described an example environment in which the techniques described herein may operate, consider now a discussion of some example content handling policies for the local compartment 124 and the remote compartment 126 in accordance with one or more embodiments.

Local Compartment Policies

As mentioned above, the local compartment 124 is representative of portions of the applications 108 that are permitted to access certain sensitive functionalities of the computing device 102. For example, the local compartment 124 includes executable code of the applications 108 that, when executed, can call code elements identified in the allowed code elements 128 and the filtered code elements 130, e.g., to be used to process content. Properties of the local compartment 124 are discussed hereafter in accordance with one or more embodiments.

Local Compartment Identification

In implementations, content included as part of the local compartment 124 is declared using a uniform resource identifier (URI) scheme that is specific to the local compartment 124. For example, content included as part of the local compartment 124 can be identified using a URI such as "local-compartment://content". When content is determined as being referenced using this URI (e.g., by the application manager module 118 and/or the content inspection module 132), the source of the content will be known to be the local compartment 124 and properties specific to the local compartment 124 will be applied to the content. Absent the URI scheme specific to the local compartment 124, content will be treated as untrusted and/or as being associated with the remote compartment 126.

Remote Executable Code

The local compartment 124 is prevented from including references to executable code (e.g., script) that is retrieved from a source that is external to the trusted content 120 and/or the computing device 102. For example, content policies associated with the local compartment 124 may specify that code included in the local compartment 124 cannot reference executable content that is external to the trusted content 120. One example of such an unpermitted reference is a uniform resource locator (URL) that references script content. The local compartment 124 may, however, reference executable content that is included as part of the trusted content 120.

Accessing Allowed Code Elements

The local compartment 124 is permitted to invoke code elements of the allowed code elements 128.

Accessing Filtered Code Elements

Content that is requested by the local compartment 124 to be passed to a code element of the filtered code elements 130 is filtered to check that the content is safe before it passed to the code element. For example, when a call to one of the filtered code elements 130 includes a reference to an instance of content (e.g., from the untrusted content 122), the content is filtered by the content inspection module 132. If the content inspection module 132 determines that the content is safe, the content is allowed to be passed to the code element. Conversely, if the content is determined to be unsafe, the content is prevented from being passed to the code element.

Content Sources

In implementations, the local compartment 124 is prevented from accessing certain types of content from sources that are external to the trusted content 120. For example, the local compartment 124 may be permitted to access media content (e.g., video content, images, audio content, and so on) from a source that is external to the trusted content 120. The local compartment 124 may be prevented, however, from accessing other types of content from a source external to the trusted content 120, such as HTML content, script content, cascading style sheets (CSS) content, and so on. This can prevent an application from including a reference to malicious content (e.g., executable code) from an untrusted source.

Third-Party Native Code

In implementations, third-party native code associated with one of the applications 108 may be stored in the local compartment 124. Third-party native code may refer to executable code that is utilized by one of the applications 108 but that is not written by a developer of the application. In such implementations, however, the third-party native code is identified by the application, e.g., declared as part of a manifest for the application. If the third-party native code is not declared by the application, the third-party native code may be prevented from being executed from the local compartment 124.

Cross-Domain Requests

In implementations, the applications 108 are permitted to invoke a cross-domain extensible markup language (XML) hypertext transfer protocol (http) request from the local compartment 124. For example, the applications 108 can include a URL that points to media content (e.g., from a website) associated with a domain that is external to the computing device 102.

Character Encoding

To protect sensitive portions of the computing device 102, character encoding restrictions can be enforced on the local compartment 124. In implementations, character encoding refers to ways in which characters (e.g., symbols) included in content data are represented on a computing device. Examples of character encoding include the Universal Character Set Transformation Formats (UTF). Certain types of character encoding can be manipulated (e.g., by malware and/or third parties) to cause undesirable performance of a computing device and/or enable unauthorized access to sensitive portions of a computing device. Thus, the local compartment 124 can be restricted to using a particular allowed character encoding, such as UTF-8.

If a particular portion of content does not have a declared character encoding format, an attempt can be made to parse the content as the allowed character encoding. If the content can be parsed using the allowed character encoding, the content can be utilized by the local compartment 124, e.g., to output content. If the content cannot be parsed using the allowed character encoding, an error can occur that prevents the content from being parsed. Further, if a particular portion of content has a declared character encoding that is different than the allowed character encoding, the content can be prevented from being parsed and/or a parsing error can occur.

Remote Compartment Policies

As mentioned above, the remote compartment 126 is representative of portions of the applications 108 that are not permitted to access certain sensitive functionalities of the computing device 102. For example, the remote compartment 126 includes executable code of the applications 108 that, when executed, is not permitted to call code elements identified in the allowed code elements 128 and the filtered code elements 130. With reference to web content, such content can be executed in the remote compartment based on the same resource permissions associated with a web browser, e.g., the browser 110. Additional properties of the remote compartment 126 are discussed hereafter in accordance with one or more embodiments.

Remote Compartment Identification

In implementations, content included as part of the remote compartment 126 is declared using a uniform resource identifier (URI) scheme that is specific to the remote compartment 126. For example, content included as part of the remote compartment 126 can be identified using a URI such as "remote-compartment://content". When content is determined as being referenced using this URI (e.g., by the application manager module 118 and/or the content inspection module 132), the source of the content will be known to be the remote compartment 126 and policies specific to the remote compartment 126 will be applied to the content. Further, content that is referenced using other URI schemes, such as "http://" and/or "https://", will be treated as being associated with the remote compartment 126 and/or an untrusted source.

Remote Executable Code

In implementations, the remote compartment 126 is permitted to include references to executable code (e.g., script) from trusted sources and untrusted sources, e.g., the trusted content 120 and/or the untrusted content 122. Since the remote compartment 126 does not have access to sensitive portions of the computing device 102, allowing the remote compartment 126 to refer to untrusted executable code does not risk exposing sensitive portions of the computing device 102 to the untrusted executable code.

Media Content

The remote compartment 126 is permitted to include references to media content from trusted sources and untrusted sources, e.g., the trusted content 120 and/or the untrusted content 122. Since the remote compartment 126 does not have access to sensitive portions of the computing device 102, allowing the remote compartment 126 to refer to untrusted media content does not risk exposing the sensitive portions of the computing device 102 to unsafe content that may be included in untrusted media content.

Third-Party Native Code

In implementations, the remote compartment 126 is not permitted to invoke and/or reference third-party native code. This can prevent such code from gaining unauthorized access to sensitive portions of a computing device.

Cross-Domain Requests

In implementations, the remote compartment 126 is not permitted to include cross-domain XML-http requests. This can prevent unsafe content from being accessed via a web site or other network resource that is accessed from the remote compartment 126.

Communication Between Compartments

In implementations, communication between the remote compartment 126 and the local compartment 124 is controlled to prevent unsafe content from being passed between compartments. For example, communication between the compartments may be allowed using a single communication technique.

One example of such a technique is adding an event generator to content in a first compartment, e.g., using the postMessage( ) method. A corresponding event listener may then be added to the other compartment, e.g., using the addEventListener( ) method. When an event is generated by the first compartment, the event is detected by the event listener in the other compartment to facilitate communication of messages between the compartments.

In some scenarios, the local compartment 124 may receive content via the postMessage( ) method and determine that the content is received from an untrusted source. In such scenarios, content filtering techniques discussed herein may be utilized to determine whether the content is safe or unsafe. Further, the content can be rejected or sanitized if it is determined that the content is unsafe.

Having described example content handling policies, consider now a discussion of some example procedures in accordance with one or more embodiments.

Example Procedures

The following discussion describes content handling techniques that may be implemented utilizing the systems, devices, and content handling policies described herein. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Further, an operation shown with respect to a particular procedure may be combined and/or interchanged with an operation of a different procedure in accordance with one or more implementations. In portions of the following discussion, reference will be made to the environment 100 of FIG. 1.

FIG. 2 depicts a procedure 200 in an example implementation in which content handling policies are enforced. A first set of content handling policies is enforced for a portion of an application that is permitted to invoke code elements of the computing device and a second set of content handling policies is enforced for a portion of the application that is not permitted to invoke the code elements (block 202). Examples of content handling policies are discussed above and below. A determination is made whether to apply the first set of content handling policies or the second set of content handling policies to content based on which portion of the application is referencing the content (block 204). For example, if the untrusted content is requested by the local compartment 124, the first set of content handling policies is applied. If the untrusted content is requested by the remote compartment 126, however, the second set of content handling policies is applied. In implementations, a determination as to which compartment is requesting the content can be made based on a URI that references the content.

Figure 3:
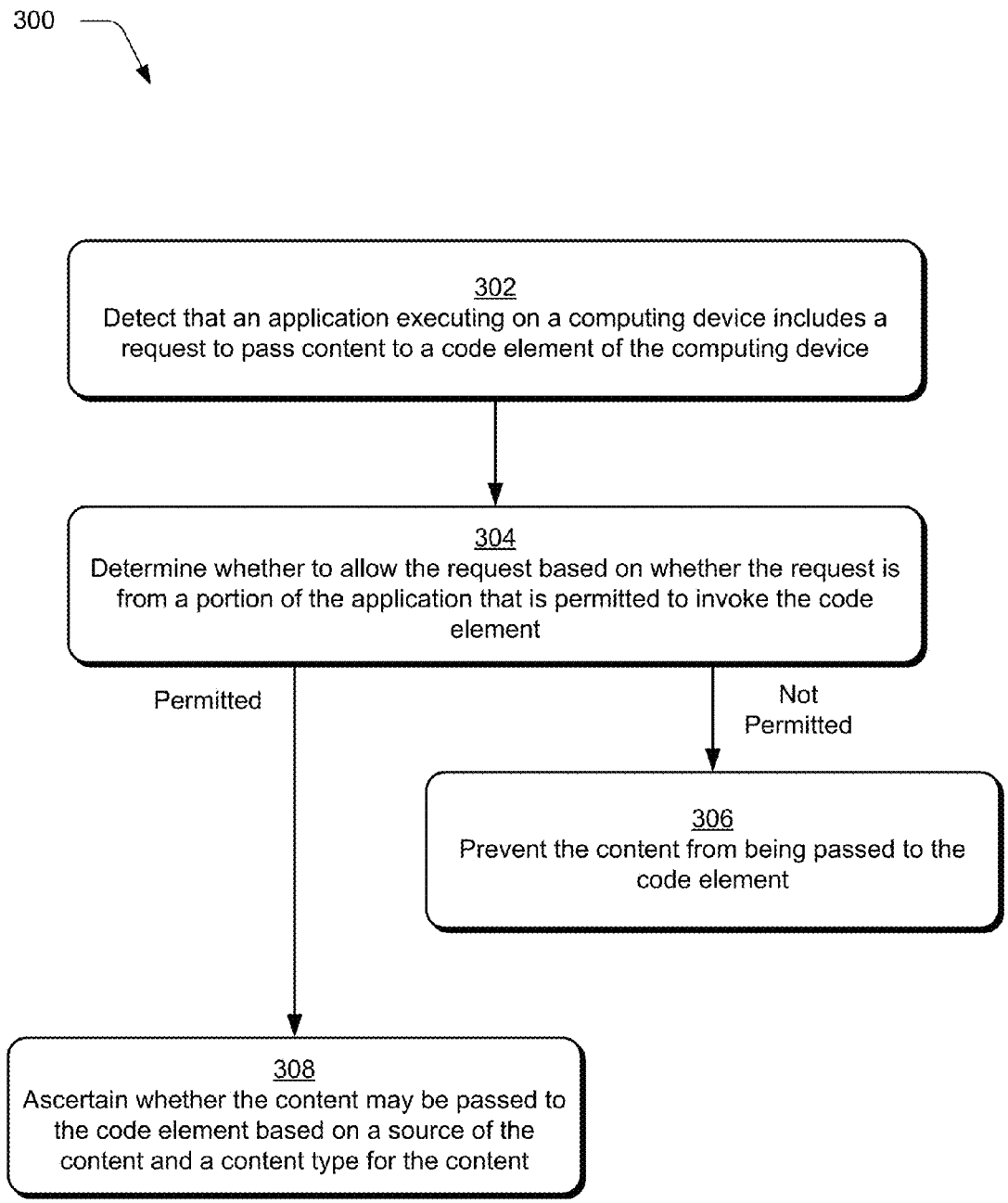
FIG. 3 is a flow diagram depicting a procedure in an example implementation in which a determination is made whether to allow a request to pass content to a code element.

FIG. 3 depicts a procedure 300 in an example implementation in which a determination is made whether to allow a request to pass content to a code element. It is detected that an application executing on a computing device includes a request to pass content to a code element of the computing device (block 302). For example, one of the applications 108 can request that an instance of content be passed to one of the allowed code elements 128 or the filtered code elements 130.

A determination is made whether to allow the request based on whether the request is from a portion of the application that is permitted to invoke the code element (block 304). With reference to the compartments discussed above, the application manager 118 can determine whether the request is from the local compartment 124 or the remote compartment 126. If the request is from a portion of the application that is not permitted to invoke the code element ("Not Permitted"), the content is prevented from being passed to the code element (block 306). As discussed above, the remote compartment 126 is not permitted to invoke code elements of the computing device 102. Thus, if it is determined that the request is from the remote compartment 126, the request may be denied.

If the request is from a portion of the application that is permitted to invoke the code element ("Permitted"), it is ascertained whether the content may be passed to the code element based on a source of the content and a content type for the content (block 308). As discussed above, in certain scenarios the local compartment 124 is permitted to invoke code elements of the computing device 102. Thus, if it is determined that the request is from the local compartment 124, the content may undergo further scrutiny to determine if the content may be passed to the code element. Example ways of determining whether the content may be passed to the code element are discussed in more detail below.

Figure 4:
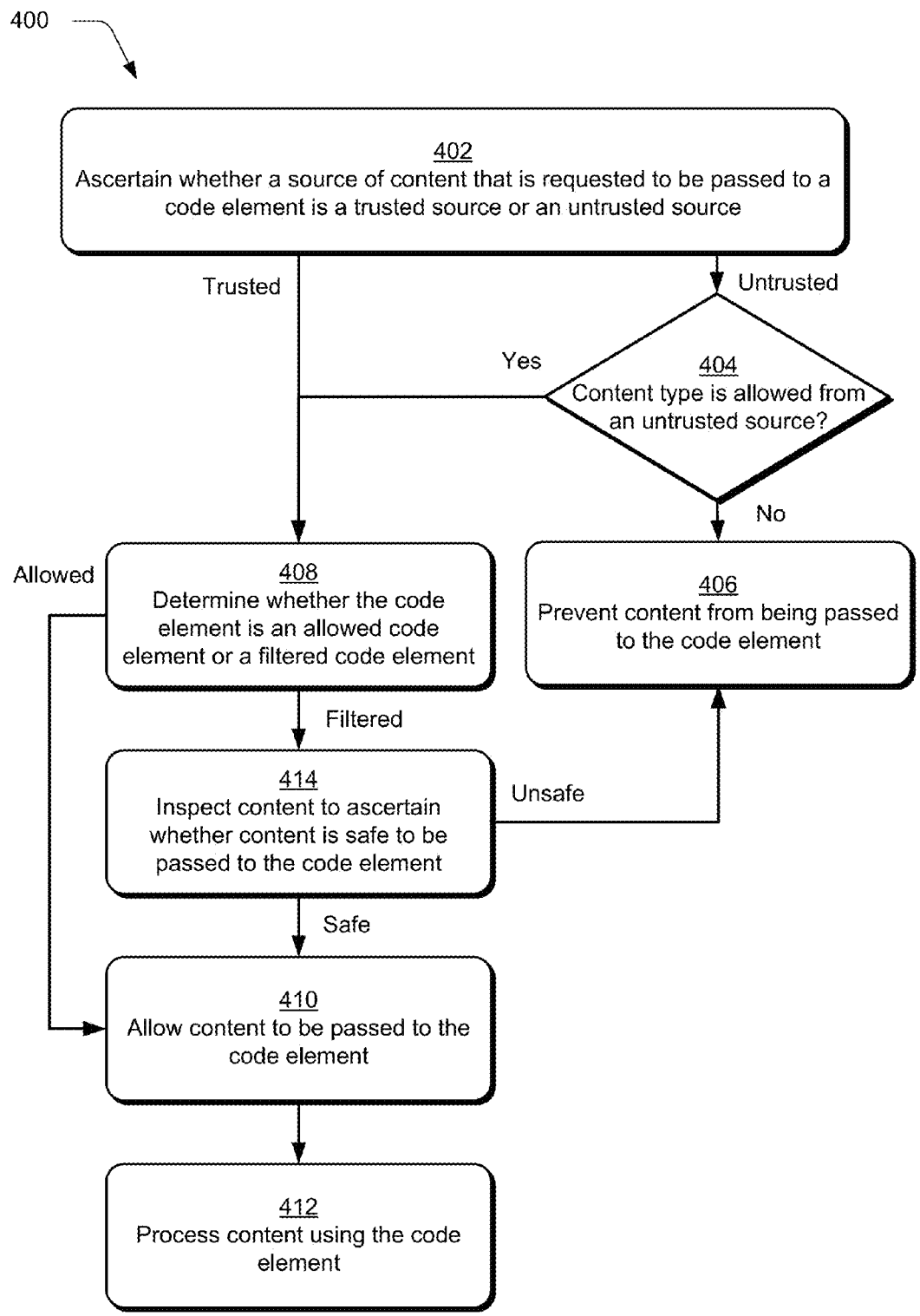
FIG. 4 is a flow diagram depicting a procedure in an example implementation in which a determination is made whether content may be passed to a code element.

FIG. 4 depicts a procedure 400 in an example implementation in which a determination is made whether content may be passed to a code element. In implementations, the procedure 400 represents a detailed technique for implementing block 308 of procedure 300, discussed above. It is ascertained whether a source of content that is requested to be passed to a code element is a trusted source or an untrusted source (block 402). If the source of the content is an untrusted source ("Untrusted"), a determination is made whether a content type for the content is allowed from an untrusted source (block 404). With reference to the environment 100 of FIG. 1, the source of the content may be the untrusted content 122. As discussed above, certain types of content (e.g., executable code) are not permitted to be retrieved from an untrusted source and passed to a code element. If the content type is not allowed from an untrusted source ("No"), the content is prevented from being passed to the code element (block 406). Alternatively, if the content type is allowed from an untrusted source ("Yes"), the procedure 400 proceeds to block 408, discussed below. Certain types of content (e.g., media content, formatting content, and so on) are permitted to be retrieved from an untrusted source and passed to a code element, subject in some implementations to further inspection to determine if the content is safe.

Returning to block 402, if the source of the content is a trusted source ("Trusted") or it is determined at block 404 that the content type is allowed from an untrusted source ("Yes"), a determination is made whether the code element is an allowed code element or a filtered code element (block 408). If the code element is an allowed code element ("Allowed"), the content is permitted to be passed to the code element (block 410). In implementations, the distinction between allowed code elements and filtered code elements can be explicitly defined, e.g., by pre-specifying a set of allowed code elements and a set of filtered code elements. Alternatively, a set of filtered code elements can be pre-specified and a particular code element can be determined by implication to be an allowed code element based on the code element not being identified in the set of filtered code elements. The content is processed using the code element (block 412). For example, the content can be processed for presentation, e.g., as part of a web page, a document, and so on.

Returning to block 408, if the code element is a filtered code element ("Filtered"), the content is inspected to ascertain whether the content is safe to be passed to the code element (block 414). For example, the content inspection module 132 can apply one or more of the content inspection policies 134 to the content to determine if the content is safe or unsafe. As discussed above, content that includes executable code may be determined to be unsafe to be passed to a filtered code element. Additionally, safe content may include static content such as images, text, audio, video, presentation data, static HTML, and so on.

In alternative implementations, a call to the code element may opt out of a content inspection scheme. For example, a computing device may determine that a call to the code element includes an indication that content associated with the call is to be exempted from a content inspection scheme. Thus, the code element can be executed using the content without first inspecting the content to determine if the content is unsafe. This can enable an application developer to bypass content inspection mechanisms in situations where the content may be rejected if inspected.

Returning to block 414, if the content is determined to be unsafe to be passed to the code element ("Unsafe"), the content is prevented from being passed to the code element (block 406). If the content is determined to be safe to be passed to the code element ("Safe"), the content is allowed to be passed to the code element (block 410). As discussed above, the content is processed using the code element (block 412).

In alternative implementations, an application can indicate that unsafe content may be sanitized by removing unsafe aspects of the content prior to allowing the content to be passed to a particular code element. For example, the application 108 can specify in its code (e.g., via a function call) that unsafe content is to be passed to the content inspection module 132, which can then remove unsafe features (e.g., executable code) from the content. The sanitized content can then be passed to the code element for further processing.

Example System and Device

Figure 5:
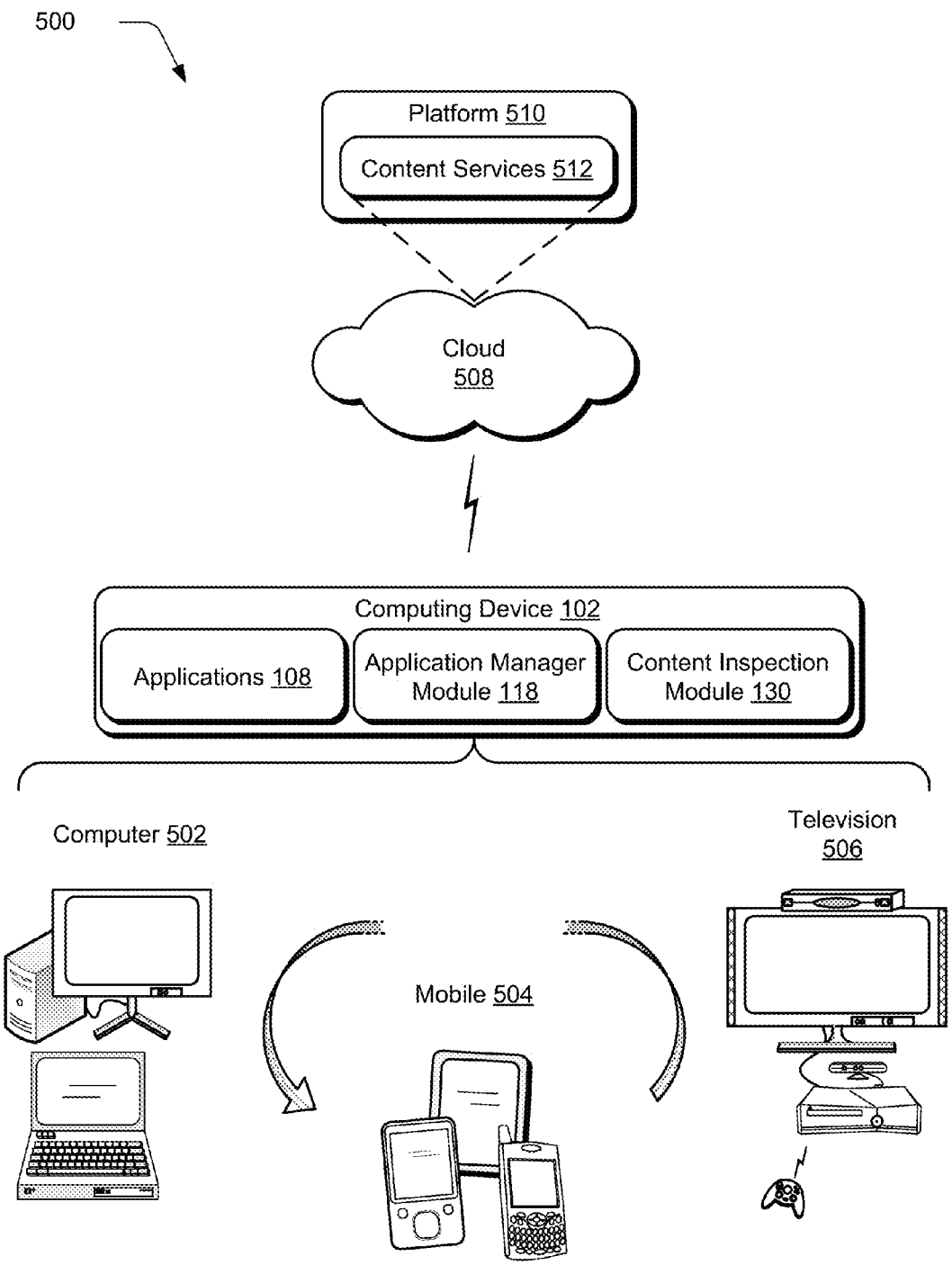
FIG. 5 illustrates an example system that includes the computing device as described with reference to FIGS. 1 and 6.

FIG. 5 illustrates an example system 500 that includes the computing device 102 as described with reference to FIG. 1. The example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 502, mobile 504, and television 506 uses. Each of these configurations includes devices that may have generally different constructs and capabilities, and thus the computing device 102 may be configured according to one or more of the different device classes. For instance, the computing device 102 may be implemented as the computer 502 class of a device that includes a personal computer, desktop computer, a multi-screen computer, laptop computer, netbook, and so on.

The computing device 102 may also be implemented as the mobile 504 class of device that includes mobile devices, such as a mobile phone, portable music player, portable gaming device, a tablet computer, a multi-screen computer, and so on. The computing device 102 may also be implemented as the television 506 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 508 includes and/or is representative of a platform 510 for content services 512. The platform 510 abstracts underlying functionality of hardware (e.g., servers) and software resources of the cloud 508. The content services 512 may include applications and/or data that can be utilized while computer processing is executed on servers that are remote from the computing device 102. Content services 512 can be provided as a service over the Internet and/or through a subscriber network, such as a cellular or Wi-Fi network.

The platform 510 may abstract resources and functions to connect the computing device 102 with other computing devices. The platform 510 may also serve to abstract scaling of resources to provide a corresponding level of scale to encountered demand for the content services 512 that are implemented via the platform 510. Accordingly, in an interconnected device embodiment, implementation of functionality of the functionality described herein may be distributed throughout the system 500. For example, the functionality may be implemented in part on the computing device 102 as well as via the platform 510 that abstracts the functionality of the cloud 508, as shown through inclusion of the applications 108, the application manager module 118, and the content inspection module 132.

Figure 6:
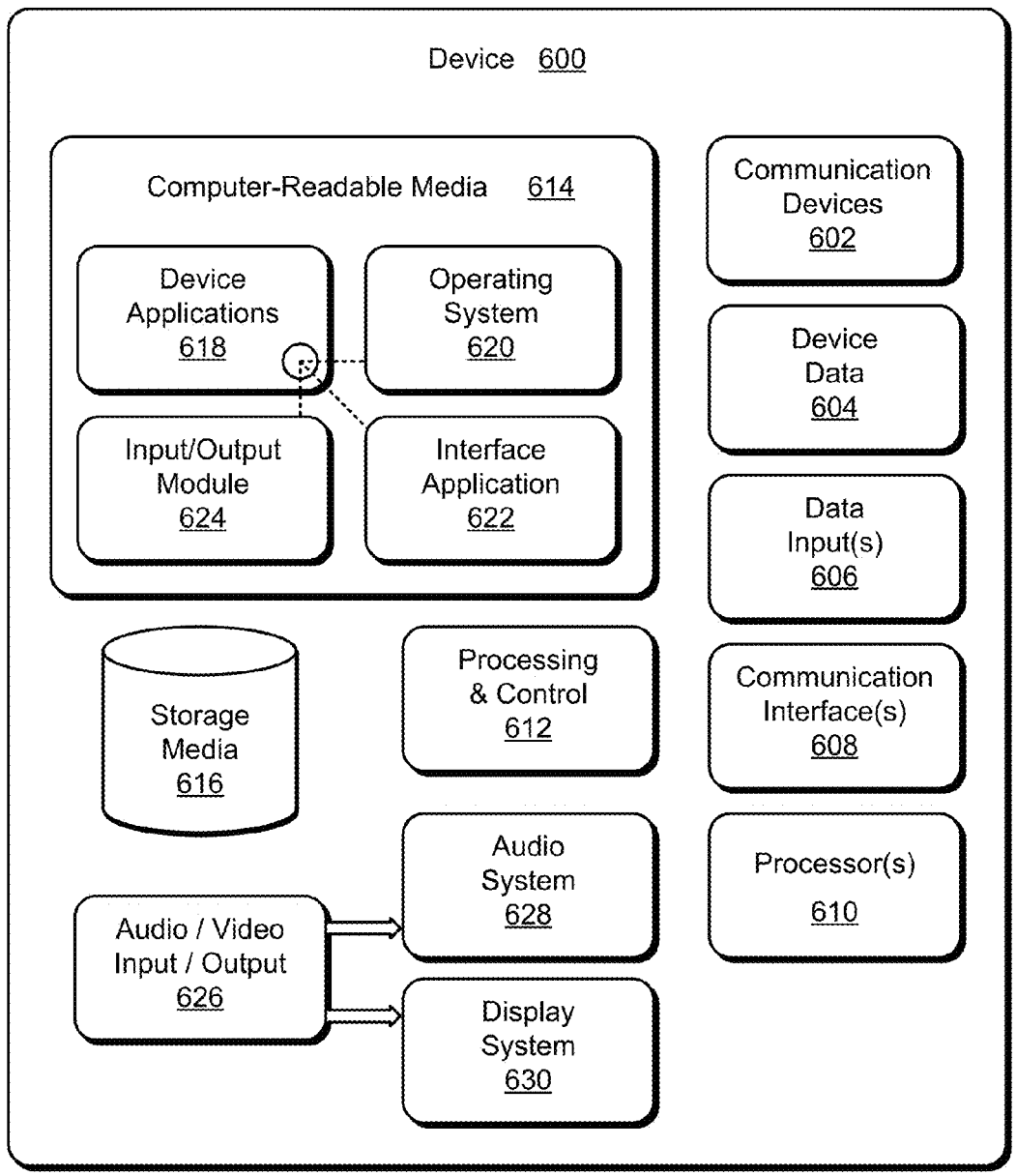
FIG. 6 illustrates various components of an example device that can be implemented as any type of portable and/or computer device as described with reference to FIGS. 1 and 5 to implement embodiments of the techniques described herein.

FIG. 6 illustrates various components of an example device 600 that can be implemented as any type of computing device as described with reference to FIGS. 1 and 5 to implement embodiments of the techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface, a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of the techniques described herein. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the techniques described herein.

In this example, the device applications 618 include an interface application 622 and an input/output module 624 that are shown as software modules and/or computer applications. The input/output module 624 is representative of software that is used to provide an interface with a device configured to capture inputs, such as a touchscreen, track pad, camera, microphone, and so on. Alternatively or in addition, the interface application 622 and the input/output module 624 can be implemented as hardware, software, firmware, or any combination thereof. Additionally, the input/output module 624 may be configured to support multiple input devices, such as separate devices to capture visual and audio inputs, respectively.

Device 600 also includes an audio and/or video input-output system 626 that provides audio data to an audio system 628 and/or provides video data to a display system 630. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   one or more processors; and
   one or more computer-readable storage devices storing instructions, comprising at least an application manager module and a content inspection module, that are executable by the one or more processors to:
   receive an indication that a portion of an application is requesting to pass content to a code element of a computing device, the application including a first compartment and a second compartment that include different respective portions of application code that enable different respective functionality to be invoked by the respective compartments of the application;

execute the content inspection module to ascertain, based at least on an identifier for the portion of the application, whether the portion of the application is part of the first compartment of the application that is permitted to access a sensitive functionality of the computing device, or part of the second compartment of the application that lacks permission to access the sensitive functionality, the first compartment having a first set of content handling policies and the second compartment having a second set of content handling policies, wherein the identifier comprises a uniform resource identifier (URI) providing a designation of the first compartment being related to a locally stored compartment or the second compartment being a remotely stored compartment in a manner specifying whether the application is permitted to access the sensitive functionality of the computing device; and execute the application manager module to apply one of the first set of content handling policies or the second set of content handling policies to the request to: (1) determine whether the application indicates that the untrusted content is to be sanitized before it is passed to the code element and (2) pass the content to the code element based on whether the portion of the application that is requesting to pass the content is part of the first compartment or the second compartment of the application, wherein the portion of the application being allowed or disallowed to pass the content to the code element subject to one of the first set of content handling policies or the second set of content handling policies.

2. The system as described in claim 1, wherein the code elements comprise one of more of a function, a subroutine, a method, a parameter, a property, or an interface.

3. The system as described in claim 1, wherein the first set of content handling policies specifies that content with a source that is remote from the computing device is untrusted content.

4. The system as described in claim 1, wherein the first set of content handling policies specifies untrusted content lacks permission to include executable code.

5. The system as described in claim 1, wherein the first set of content handling policies specifies that responsive to ascertaining that the content includes untrusted content and that the portion of the application is part of the first compartment, the untrusted content is to be inspected to determine whether the untrusted content is safe before the untrusted content is permitted to be passed to the code element.

6. The system as described in claim 5, wherein the instructions are further executable by the one or more processors to determine whether the application is opting out of content inspection for the untrusted content.

7. The system as described in claim 1, wherein the first set of content handling policies specifies that content retrieved locally from the computing device is to be encoded using a specific character encoding format or the content will be prevented from being parsed.

8. A method comprising:

detecting that a portion of an application executing on a computing device is requesting to pass content to a code element of the computing device, wherein the computing device comprises an application manager module and a content inspection module;

ascertaining, by the content inspection modules of the computing device, and based at least on an identifier for the portion of the application, whether the portion of the application is part of a first compartment of the application that is permitted to access a sensitive functionality of the computing device, or part of a second compartment of the application that lacks permission to access the sensitive functionality, the first compartment and the second compartment including different respective portions of application code that enable different respective functionality to be invoked by the respective compartments of the application, wherein the identifier comprises a uniform resource identifier (URI) that references the first compartment being related to a locally stored compartment or the second compartment being related to a remotely stored compartment in a manner specifying whether the application is permitted to access the sensitive functionality of the computing device; and responsive to the ascertaining, determining, by the application manager module of the computing device, whether the application indicates that the untrusted content is to be sanitized before it is passed to the code element and whether to allow or disallow the request based on whether the portion of the application is part of the first compartment or the second compartment.

9. The method as described in claim 8, wherein the code element is included as part of a pre-specified group of code elements based on the code element enabling access to the sensitive functionality of the computing device.

10. The method as described in claim 8, wherein the code element comprises at least one of a function, a subroutine, a method, a parameter, a property, or an application programming interface (API).

11. The method as described in claim 8, further comprising, in response to a determination that the portion of the application is part of the first compartment, ascertaining whether the content is permitted to be passed to the code element based on a source of the content and a content type for the content.

12. The method as described in claim 11, further comprising ascertaining that the content lacks permission to be passed to the code element based on a determination that the source of the content is remote from the computing device and the content type indicates that the content includes executable code.

13. The method as described in claim 8, further comprising, in response to a determination that the portion of the application is part of the first compartment and that the content is from an untrusted source, inspecting the content to determine whether the content is safe or unsafe to be passed to the code element.

14. The method as described in claim 8, further comprising preventing the content from being passed to the code element in response to a determination that the portion of the application is part of the second compartment.

15. The method as described in claim 8, further comprising allowing the content to be passed to the code element in response to ascertaining, based on a uniform resource indicator (URI) that references the content, that the source of the content is local to the computing device.

16. A method, comprising:

determining that a portion of an application is requesting that content be passed to a code element of a computing device, wherein the computing device comprises an application manager module and a content inspection module;

determining, at the content inspection modules of the computing device, and based on at least an identifier for the portion of the application, whether the portion of the application is a first portion of the application that is permitted to invoke the code element or a second portion of the application that lacks permission to invoke the code element, the first portion and the second portion of the application identifying different respective sets of code elements that enable different respective functionality to be invoked by the respective portions of the application, wherein the identifier comprises a uniform resource identifier (URI) that references the first compartment being related to a locally stored compartment or the second compartment being related to a remotely stored compartment in a manner specifying whether the application is permitted to access the sensitive functionality of the computing device;

determining, by the application manager module of the computing device, that the portion of the application is the first portion of the application that is permitted to invoke the code element; and ascertaining, by the computing device, whether the application indicates that the untrusted content is to be sanitized before it is passed to the code element and whether the content is permitted to be passed to the code element based on at least one of a source of the content or a content type for the content.

17. The method as described in claim 16, further comprising allowing the content to be passed to the code element in response to ascertaining, based on a uniform resource indicator (URI) that references the content, that the source of the content is local to the computing device.

18. The method as described in claim 16, further comprising preventing the content from being passed to the code element based on ascertaining that the source of the content is remote from the computing device and that the content type indicates that the content includes executable code.

19. The method as described in claim 16, further comprising ascertaining that the source of the content is remote from the computing device and inspecting the content to determine whether the content is safe or unsafe to be passed to the code element.

20. The method as described in claim 16, wherein the set of code elements associated with the first portion of the application includes pre-specified allowed code elements and the ascertaining by the computing device whether the content is permitted to be passed to the code element is further based on the pre-specified allowed code elements included in the first portion of the application.

* * * * *